United States Patent Office 2,853,457
Patented Sept. 23, 1958

2,853,457

POLYMERIC HYDROSOLS COMPRISING AN UN-
SATURATED PROTEIN DERIVATIVE AND A
COMBINATION OF UNSATURATED MONO-
MERS

John W. Gates, Jr., and William F. Fowler, Jr., Rochester, N. Y., assignors to Eastman Kodak Company, Rochester, N. Y., a corporation of New Jersey No Drawing. Application December 14, 1953
Serial No. 398,234

7 Claims. (Cl. 260—8)

Our invention relates to polymeric hydrosols in which one of the components thereof is an unsaturated acid derivative of a protein. Our invention also relates to the compositions of those hydrosols with proteins particularly gelatin.

Gelatin when dry is characterized by a certain degree of brittleness. Hence various attempts have been made to improve the flexibility of gelatin by adding to coating compositions thereof flexibility improving materials. Many of these attempts have been unsatisfactory due to the fact that the materials added to the gelatin solutions have either been incompatible with the gelatin at some point in its use or themselves have exhibited brittleness. The use of gelatin particularly in sensitized photographic goods is wide spread at the present time and the improving of the flexibility of the gelatin has been desirable in many of those uses.

One object of our invention is to provide polymeric hydrosols which are compatible both with gelatin solutions and gelatin coatings under various conditions. Another object of our invention is to provide polymeric hydrosols in which unsaturated acid derivatives of protein are employed as one of the components in their preparation. A further object of our invention is to provide gelatin compositions with improved flexibility but with substantially the same refractive index as gelatin itself. A still further object of our invention is to improve gelatin by mixing therewith an aqueous dispersion of a polymer prepared by polymerizing an unsaturated derivative of a protein with an alkyl acrylate, the alkyl of which is at least two carbon atoms and a strengthening component. Other objects of our invention will appear herein.

We have found that polymeric hydrosols having the above and other properties are prepared by the emulsion polymerization of an unsaturated acid derivative of a protein with one or more alkyl esters of acrylic (the alkyl being of at least 2 carbon atoms) or methacrylic acid (the alkyl being of at least 4 carbon atoms) or butadiene, isoprene or chloroprene and one or more monomers which have strenthening properties. We have found that hydrosols as thus prepared can be mixed with gelatin in aqueous solution in all proportions, that no coagulation will occur in the preparation of coatings from gelatin solutions of this nature and that the coatings prepared from such compositions will have excellent flexibility and optical clarity, without decreasing the tensile strength of the gelatin. We have found that those polymeric hydrosols are compatible not only with the conventional photographic gelatins but also with hydrolyzed gelatins such as glue to produce compositions which will give clear flexible coatings upon coating out and drying.

These hydrosols or latices are prepared by the emulsion polymerization of a mixture of the reaction product of an unsaturated acid and protein, certain alkyl esters of acrylic or methacrylic acid (or butadiene, isoprene or chloroprene) and a strengthening component. The protein compounds which have been found to be particularly useful in this connection are maleyl proteins, acrylyl proteins and methacrylyl proteins such as described in U. S. Patent No. 2,548,520 of Damschroder and Gates. The protein compounds which have been found to be most useful in our invention are those of gelatin either refined, e. g. photographic gelatin, or unrefined e. g. glue. The alkyl acrylate which is employed as a flexibilizer component of the polymer is one in which the alkyl (unsubstituted or substituted) is of at least 2 carbon atoms. Some of the acrylic acid esters which may be employed as the flexibilizing component in preparing hydrosols in accordance with our invention are ethyl acrylate, n-propyl acrylate, isopropyl acrylate isobutyl acrylate, n-amyl acrylate, isoamyl acrylate, n-hexyl acrylate, 2-ethyl hexyl acrylate, β-cyanoethyl acrylate, hydroxy ethyl acrylate, chloroethyl acrylate, n-butyl acrylate, and hydroxy propyl acrylate. Also methacrylates of alkyls of 4–10 carbon atoms such as of n-butyl, n-hexyl, 2-ethyl hexyl or n-octyl, or butadiene, isoprene or chloroprene are useful as a flexibilizing component in preparing polymeric hydrosols in accordance with our invention. Either a single compound or a mixture of compounds as listed may be employed as the flexibilizing component.

The strengthening component may be any one or a mixture of a number of unsaturated monomers such as styrene, acrylonitrile, methyl acrylate, methyl methacrylate, ethyl methacrylate, o-methyl styrene, m-methyl styrene, p-methyl styrene, 2,4-dimethyl styrene, 2,5-dimethyl styrene, 3,4-dimethyl styrene, 3,5-dimethyl styrene, 2,4,5-trimethyl styrene, 2,4,6-trimethyl styrene, 2,4,5-triethyl styrene, o-ethyl styrene, m-ethyl styrene, p-ethyl styrene, 3,5-diethyl styrene, p-n-butyl styrene, m-sec-butyl styrene, m-tert-butyl styrene, p-hexyl styrene, p-n-heptyl styrene, p-2-ethylhexyl styrene, o-fluoro styrene, m-fluoro styrene, p-fluorostyrene, o-chloro styrene, m-chloro styrene, p-chloro styrene, 2,3-dichloro styrene, 2,4-dichloro styrene, 2,5-dichloro styrene, 2,6-dichloro styrene, 3,4-dichloro styrene, 3,5-dichloro styrene, 2,3,4,5,6-pentachloro styrene, m-trifluoromethyl styrene, o-cyano styrene, m-cyano styrene, m-nitro styrene, p-nitro styrene, p-dimethylamino styrene, α-chloroacrylonitrile, bromoacrylonitrile, α - trifluoromethyl acrylonitrile, α-trifluoromethyl carboxy acrylonitrile, vinyl acetate, vinylidene chloride and isopropenyl acetate.

If desired there may also be employed in preparing hydrosols in accordance with our invention 0–20%, based on the total monomer employed, of acrylic acid or acrylamide.

In preparing the polymeric hydrosols the protein derivative should be within the range of 14–60% based on the total monomer including the protein derivative employed in the preparation. The flexibilizer component, one or more of the alkyl acrylates mentioned, should be in the proportion of 1½–5 parts per part of the strengthening component. Instead of the unsaturated acid derivative of gelatin or glue there may be employed as the protein derivative the compound of some other protein acylated with an unsaturated acid, particularly one of casein or soy protein.

The preparation of the hydrosol is carried out in an aqueous system which preferably will contain a micell-forming surface active agent to facilitate the dispersion of the monomers therein. A catalyst, such as a per compound or a similar polymerization promoting material, is desirable to promote the reaction. The polymerization of the mixture of monomers is preferably carried out at an elevated temperature such as at 80° C. although a higher temperature may be employed. The use of excessive temperatures however is less desirable except where provision is made for release of the pressure which might build up using higher temperatures, such as by the use of a reflux condenser or performing the reaction in an autoclave. Lower temperatures such as in the range of 50–80° C. can be used but with those temperatures considerably more time may be required to obtain the hydrosol. It is desirable to employ a Redox type catalyst when operating at relatively low temperatures.

Any of the agents known for that purpose may be employed as the micell-forming surface active agent in emulsion polymerizations in accordance with our invention such as the salt of a higher fatty acid, e. g. sodium or potassium stearate, palmitate, etc., a salt of a higher fatty alcohol sulfate, e. g. sodium or potassium lauryl sulfate, sodium or potassium di-(2-ethyl hexyl) sulfosuccinate, sodium or potassium cetyl sulfate, sodium or potassium stearyl sulfate, etc., a salt of an aromatic sulfonic acid, e. g. a sodium or potassium salt of an alkyl naphthalene sulfonic acid, a higher molecular weight quaternary ammonium salt containing the radical $C_{15}H_{31}$ or $C_{17}H_{35}$ etc.

Some of the per catalysts which may be employed in preparing polymeric hydrosols in accordance with our invention are organic peroxides such as benzoyl peroxide, acetyl peroxide, lauroyl peroxide, tert. butyl hydroperoxide or hydrogen peroxide, persulfates such as of sodium, potassium or ammonium or persulfuric acid, perborates such as of sodium or potassium, the water soluble salts of percarbonic acid, the water soluble salts of perphosphoric acid or the water soluble salts of sulfo-peracids.

After the hydrosol has been formed it may be employed directly by mixing with an aqueous solution of gelatin or like colloid or in some cases the dispersion of the polymer may be held for later use. The hydrosols formed can be mixed with glue or gelatin in proportions such as from 10 to 95% based on the weight of gelatin. Coatings prepared from the resulting compositions have good flexibility and optical clarity.

The hydrosols may be preserved by mixing the same with gelatin in a composition in which the gelatin is at least as much in amount as the polymer of the hydrosol. Upon drying, the resulting composition is found to be readily redispersible in water at a later date. In each case the resulting dried product is readily redispersible in water. This method forms the subject of copending application Serial No. 398,235, filed of even date, in the name of Gates, Dann and Illingsworth.

The compositions resulting from mixing hydrosols prepared in accordance with our invention with gelatin may be coated out by any conventional procedure onto a surface to be coated. The coatings thus prepared exhibit good flexibility properties which makes these coatings useful in the field of sensitized photographic products not only for protective purposes but also as the carrier for silver halide in photographic emulsions.

The following examples illustrate the preparation of hydrosols in accordance with our invention:

Example 1

182 parts of a filtered 20% aqueous solution of methacrylyl glue (5% methacrylyl content) were slowly added with mechanical stirring to a solution containing 1.27 parts of potassium persulfate, 5 parts of sodium lauryl sulfate and 860 parts of tap water, the solution having a temperature of 80° C. There was also added to the solution a mixture of 150 parts of n-butyl acrylate and 64 parts of acrylonitrile. The addition was completed in about one hour.

There was obtained a slightly translucent purplish hydrosol having a pH of 5.73. The hydrosol was cooled to room temperature and filtered. A small portion of the hydrosol was diluted with an equal volume of water and the diluted hydrosol was mixed with an equal volume of a 10% gelatin solution and coated on a glass plate. The coating was dried at room temperature for 16 hours and a clear flexible film was obtained.

Example 2

The preceding example was substantially duplicated except that maleyl glue having a 5% maleyl content was employed instead of methacrylyl glue and the reaction temperature used was 85° C. A product similar to that obtained in Example 1 was obtained. This hydrosol will store for several weeks either at room temperature or at 40° F., and was miscible with aqueous gelatin solutions in all proportions. The films obtained from a mixture of the hydrosol with gelatin were much more flexible than those obtained from a gelatin solution without any addition thereto.

Example 3

A series of hydrosols were prepared in the manner described in the above examples using maleated glues of varying maleyl contents, namely, 2%, 5%, 10% and 20%. The hydrosols obtained especially from the maleyl glues of lower maleyl contents were found when mixed with gelatin and coated out to give films having excellent flexibilities.

Example 4

Example 2 was repeated except that the sodium lauryl sulfate was omitted. A hydrosol was obtained having somewhat larger particle size than obtained in Example 2.

Example 5

The procedure of Example 2 was repeated except that, instead of the maleyl glue, a maleyl gluten having a 5% moleyl content was employed. A hydrosol was obtained of somewhat larger particle size than resulted from the procedure of Example 2.

Where a wetting agent is employed in the emulsion polymerization process, the hydrosol obtained has somewhat smaller particle size, a faster copolymerization occurs and there is less tendency for residual monomers to be present in the finished product.

Example 6

To an agitated solution of 1.27 parts of potassium persulfate and 5 parts of sodium lauryl sulfate in 854 parts of water at 80° C. was added slowly a mixture of 150 parts of n-butyl acrylate and 64 parts of styrene together with a solution of 40 parts of maleyl glue (5% maleyl content) in 146 parts of water. The addition occurred over a period of 15 minutes and the mass was then held at 80° C. for one hour. A translucent hydrosol was obtained which dries down to a clear film or mixed with gelatin in various proportions forms a mixture from which clear films can be obtained.

Example 7

There was slowly added to an agitated solution of 1.27 parts of potassium persulfate and 5 parts of sodium lauryl sulfate in 850 parts of water at 85° C. a mixture of 150 parts of n-butyl acrylate and 64 parts of methyl acrylate as well as a solution of 40 parts of 5% maleyl glue. The addition took place over a 17 minute period and the mass was then held for 10 minutes at 85° C. A hydrosol was obtained which could be coated out in the form of a clear film or could be mixed with gelatin and coated out to form a clear film.

Example 8

There was slowly added to an agitated solution containing 0.25 part of potassium persulfate and 1 part of sodium lauryl sulfate in 847 parts of water at 88° C. both a mixture of 22 parts of n-butyl acrylate and 10 parts of acrylonitrile and a solution of 21 parts of 5% maleyl gelatin in 153 parts of water. This addition took place over a 15 minute period and the mass was then held at 88° C. for 45 minutes. The hydrosol obtained and the mixtures thereof with gelatin when coated out form clear films.

Example 9

There was slowly added to an agitated solution of 3.18 parts of potassium persulfate in 620 parts of water at 85° C., both a mixture of 108 parts of n-butyl acrylate and 46 parts of acrylonitrile and a solution of 100 parts of 5% maleyl glue and 10 parts of acrylic acid in 380 parts of water. The addition took place over a 17 minute period and the mass was then held at 85° C. for 30 minutes. The hydrosol obtained had similar characteristics to those of the hydrosols prepared in the preceding examples.

Example 10

There was slowly added to an agitated solution of 1.41 parts of potassium persulfate and 2.22 parts of sodium lauryl sulfate in 700 parts of water at 85° C. a mixture of 46.6 parts of n-butyl acrylate and 20 parts of acrylonitrile together with a solution of 44.4 parts of maleyl oxidized casein (5% maleyl content) in 300 parts of water over a 20 minute period. The mass was maintained at 85° C. for 1½ hours. A hydrosol was obtained having properties like those which characterize the hydrosols prepared in accordance with the process described herein. Oxidized casein maleyl derivatives are disclosed in U. S. application Serial No. 768,480 of Lowe and Gates.

Example 11

There was slowly added to an agitated solution of 0.57 part of potassium persulfate and 2.22 parts of sodium lauryl sulfate in 880 parts of water both a mixture of 65 parts of n-butyl acrylate and 28 parts of styrene and a solution of 17.8 parts of 5% maleyl oxidized casein in 120 parts of water. The addition took place over a 13 minute period and the temperature of the mass was then held at 85° C. for 30 minutes. A hydrosol having the characteristic properties of the hydrosols described herein was obtained.

Example 12

There was slowly added to an agitated solution of 0.22 part of potassium persulfate and 0.55 gram of sodium lauryl sulfate in 220 cc. of water a solution of 7.0 parts of 5% maleyl glue in 30 cc. of water and a mixture of 5.3 parts of styrene and 15.7 parts of isoprene. The vessel containing the resulting mass was sealed, placed in a water bath at 70° C. and rotated for 5½ hours. A hydrosol having the characteristic properties of the hydrosols described herein was obtained.

Example 13

There was added to a stirred solution of 3.18 parts of potassium persulfate in 620 cc. of distilled water at 85° C. over a period of 17 minutes 108 parts of n-butyl acrylate, 46 parts of acrylonitrile, 10 parts of acrylic acid and a solution of 100 parts of 5% maleyl glue in 480 cc. of distilled water. The mass was then heated for 30 minutes at 85° C. while stirring and was then cooled. A hydrosol having the characteristic properties of the hydrosols prepared in accordance with the process described herein was obtained.

Example 14

There was added to a stirred solution of 1.91 parts of potassium persulfate in 372 cc. of distilled water at 85° C. over a period of 7 minutes 65 parts of n-butyl acrylate, 28 parts of acrylonitrile, 6 parts of acrylamide and a solution of 60 parts of 5% maleyl glue in 288 cc. of distilled water. The mass was heated for 30 minutes at 85° C. with stirring and then cooled. A characteristic hydrosol was obtained.

In the preparation of the hydrosols in accordance with our invention it is desirable to employ the protein derivative in a considerably dilute condition as the hydrosol obtained in a dilute dispersion has better characteristics, and remains stable for longer periods of time. It is also preferable that the acyl substituent combined with the protein be somewhat limited for best results.

The hydrosols prepared in accordance with our invention are miscible with gelatin solutions in various proportions and are compatible with the gelatin both in solution form and after a layer of the mixture has been coated out and dried. These additives may be mixed with gelatin in proportions of 5-95% based on the dry weight of the gelatin. In view of the fact that these polymeric materials contribute to the flexibility of the gelatin, the gelatin at least in part may be replaced by hydrolyzed gelatin or glue which otherwise would result in a brittle coating. The polymeric hydrosols prepared in accordance with our invention may be used either by themselves or in mixture with gelatin or other proteins for sizing purposes, such as for either the tub or beater sizing of paper, as the adhesive in a baryta layer used in coating paper, as an overcoating over the baryta layer or over the sensitized emulsion of photographic paper or in the photosensitive emulsion itself in photographic film or paper manufacture. These hydrosols either alone or mixed with gelatin are useful compositions employed for backing layers, subbing layers, in the photosensitive emulsion themselves or for overcoatings and interlayers in products to be employed in photographic color processes.

We claim:

1. A polymeric hydrosol resulting from the emulsion polymerization of a mixture essentially consisting of 14-60% of a protein having an unsaturated acid radical chemically combined therewith, a flexibilizing component selected from the group consisting of the alkyl acrylates in which the alkyls are saturated and of 2-10 carbon atoms, the alkyl methacrylates, in which the alkyls are saturated and of 4-10 carbon atoms, butadiene, isoprene, and chloroprene and a strengthening component selected from the group consisting of styrene, acrylonitrile, methyl acrylate, methyl methacrylate, ethyl methacrylate, vinyl acetate, vinylidene chloride, isopropenyl acetate, substituted styrenes having the structural formula:

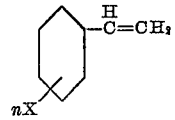

X being selected from the group consisting of saturated alkyls (when $n=1$ to 3) halogen (when $n=1$ to 5) cyano, nitro, alkyl amino and halogen substituted alkyl groups (in the case of which groups $n$ is 1) and the substituted acrylonitriles having the formula:

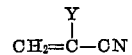

in which Y is a substituent selected from the group of halogen, halogen substituted alkyl and halogenated alkyl carboxy groups, the flexibilizing component being present in the mixture in the proportion of 1½-5 parts per part of the strengthening component.

2. A polymeric hydrosol resulting from the emulsion polymerization of a mixture essentially consisting of 14-60% of a protein having an unsaturated acid radical chemically combined therewith, a flexibilizing component selected from the group consisting of the alkyl acrylates in which the alkyls are saturated and of 2-10 carbon atoms, the alkyl methacrylates, in which the alkyls are saturated and of 4-10 carbon atoms, butadiene, isoprene, and chloroprene, a strengthening component selected from the group consisting of styrene, acrylonitrile, methyl acrylate, methyl methacrylate, ethyl methacrylate, vinyl acetate, vinylidene chloride, isopropenyl acetate, substituted styrenes having the structural formula:

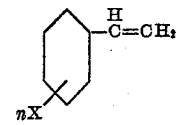

X being selected from the group consisting of saturated alkyls (when $n=1$ to 3) halogen (when $n=1$ to 5) cyano, nitro, alkyl amino and halogen substituted alkyl groups (in the case of which groups $n$ is 1) and the substituted acrylonitriles having the formula:

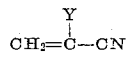

in which Y is a substituent selected from the group of halogen, halogen substituted alkyl and halogenated alkyl carboxy groups, the flexibilizing component being present in the mixture in the proportion of 1½–5 parts per part of the strengthening component, and up to 20% of a monomer selected from the group consisting of acrylic acid and acrylamide.

3. A polymeric hydrosol which results from the emulsion polymerization of a mixture essentially consisting of 14–60% of methacrylyl glue, N-butyl acrylate and acrylonitrile, the butyl acrylate being present in the proportion of 1½–5 parts per part of acrylonitrile.

4. A polymeric hydrosol which results from the emulsion polymerization of a mixture essentially consisting of 14–60% of maleyl glue, n-butyl acrylate and acrylonitrile, the butyl acrylate being present in the proportion of 1½–5 parts per part of acrylonitrile.

5. A polymeric hydrosol which results from the emulsion polymerization of a mixture essentially consisting of 14–60% of maleyl glue, n-butyl acrylate and styrene, the butyl acrylate being present in the proportion of 1½–5 parts per part of styrene.

6. A polymeric hydrosol which results from the emulsion polymerization of a mixture essentially consisting of 14–60% of malelyl glue, n-butyl acrylate and methyl acrylate, the butyl acrylate being present in the proportion of 1½–5 parts per part of methyl acrylate.

7. A composition of matter comprising the mixture of an aqueous solution of gelatin and a polymeric hydrosol which results from the emulsion polymerization of a mixture essentially consisting of 14–60% of malelyl glue, 1½–5 parts of normal butyl acrylate and one part of acrylonitrile, the parts being by weight based on the dry weight of the various solid components.

References Cited in the file of this patent

UNITED STATES PATENTS

| | | |
|---|---|---|
| 1,938,730 | Tschunkur et al. | Dec. 12, 1933 |
| 2,191,654 | Haon | Feb. 27, 1940 |
| 2,456,295 | Mast | Dec. 14, 1948 |
| 2,548,520 | Damschroder et al. | Apr. 10, 1951 |